United States Patent [19]

Swanson

[11] 3,883,874
[45] May 13, 1975

[54] SYSTEM FOR PROVIDING A REFERENCE FREQUENCY SOURCE
[76] Inventor: Eric R. Swanson, 640 Sinergate Ave., San Diego, Calif. 92106
[22] Filed: Sept. 28, 1973
[21] Appl. No.: 401,732

[52] U.S. Cl. .............................. 343/105 R; 331/25
[51] Int. Cl. ............................................. G01s 1/30
[58] Field of Search ..................... 343/105 R; 331/25

[56] References Cited
UNITED STATES PATENTS
2,969,538   1/1961   Palmer ........................... 343/105 R
3,295,127   12/1966  Kross ................................. 343/7 A
3,789,408   1/1974   Ichihara et al. ................. 343/105 R Primary Examiner—Richard A. Farley
Assistant Examiner—T. M. Blum
Attorney, Agent, or Firm—R. S. Sciascia; G. J. Rubens; T. M. Phillips

[57] ABSTRACT

A standard frequency package for radio communications and navigation and comprising VLF transmissions as a source of standard frequency. Commuted signals at the same frequency are utilized without regard to source details or phase, and a receiving antenna is multiplexed, thereby permitting the use of a poor oscillator in the system.

1 Claim, 1 Drawing Figure

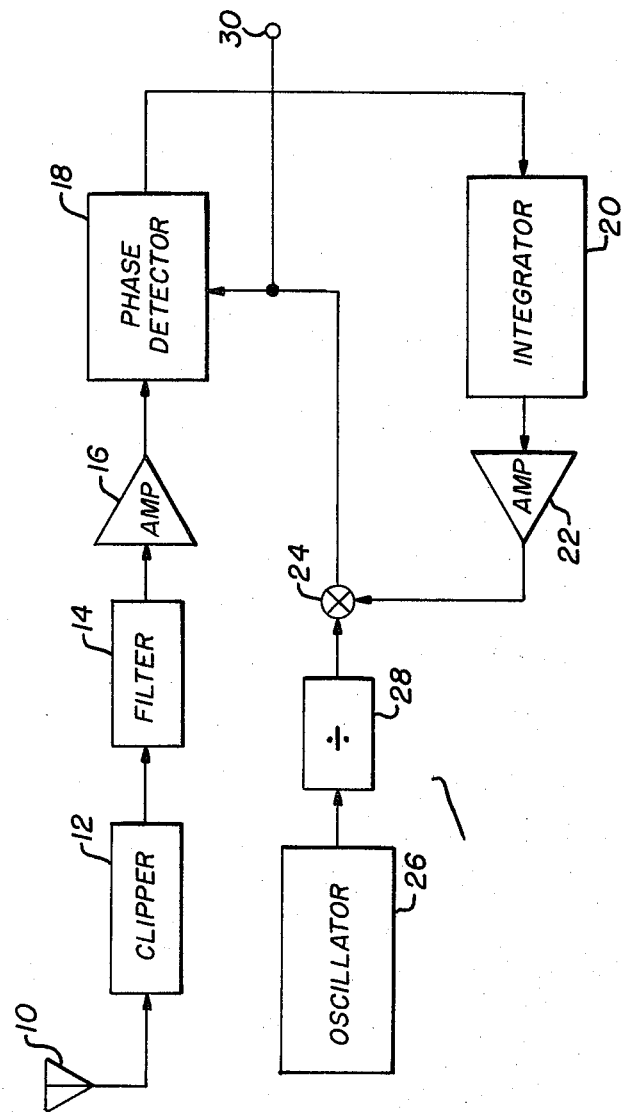

SYSTEM FOR PROVIDING A REFERENCE FREQUENCY SOURCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Standard frequency is becoming increasingly necessary for radio communications and navigation functions. Several specific requirements may be identified. Absolute frequency must be controlled sufficiently such that allocated frequencies can be transmitted and receivers may acquire transmitted signals. Furthermore, stability must be maintained at a level such that frequency standard does not add frequency modulation to the signals to such an extent that the processed information is significantly degraded.

The prior art solution for standard frequency has been design of better oscillators which have sufficient accuracy, reasonable aging rate, temperature coefficients, etc. Unfortunately, as required accuracy is increased, such oscillators become more expensive and often more difficult to use due to such factors as warmup and the need for occasional recalibration.

SUMMARY OF THE INVENTION

Standard frequency apparatus for general use in communication and navigation systems is disclosed. The apparatus comprises the concept of receiving and phase tracking VLF signals without decommutation. In combination with the above, a relatively poor oscillator can be used since it need not provide the inherent stability. Standard frequency information is received and thus complete reliance is not placed on a standard oscillator since VLF transmissions are a source of standard frequency and since they fall within a frequency band well removed from those frequencies commonly used for communication. Once the VLF signals are received, frequency stability is determined by the VLF propagational variation and Doppler effects. Maximum signal redundancy is used with minimum complexity by receiving the VLF signals without concern as to source or phase, that is, without commutating.

STATEMENT OF THE OBJECTS OF INVENTION

It is a primary object of the present invention to provide a standard frequency package for general use in radio communications and navigational systems.

Other objects, advantages and novel features of the invention will become apparent from the following detailed description of the invention when considered in conjunction with the accompanying drawings.

BRIEF DESCRIPTION OF THE DRAWING

The FIGURE is a simplified block diagram of the inventive concept disclosed herein comprising a standard frequency package.

DESCRIPTION OF THE PREFERRED EMBODIMENT

As stated above, the FIGURE illustrates in simplified block diagram form a receiver station apparatus comprising a standard frequency package to be disclosed herein. In operation the antenna 10 receives VLF signals at a frequency $f_1$ from a number of different, separated transmitter sources (not shown). The signals can comprise well-known OMEGA signals which are transmitted in time-diversity, i.e., commutated. The signals received by antenna 10 are fed to a clipper 12 which is designed to operate only on high noise spikes.

The clipped output of 12 is then filtered in 14 and amplified in the band-pass amplifier 16. The amplified output is fed to phase detector 18 whose output, $V_1$, is integrated in 20, amplified in 22, and then applied as a DC voltage to the phase shifter 24.

An oscillator 26 provides a frequency which is divided in 28 to produce a frequency $f_2$ which is also applied to the phase shifter 24. The output of the phase shifter comprises a third frequency, $f_2 \pm \Delta f$, and is fed to the phase detector 18, $\Delta f$ being introduced by the rate of phase shift effected by phase shifter 24 due to the drive voltage from amplifier 22. The output of the phase shifter 24 is also taken at the output terminal 30 as the standard frequency, $f_s$.

As is well known, standard frequency describes a frequency source of high quality such that dirunal changes average to a standard or zero drift. The output of the phase detector 18 is designated as $V_1$ in the FIGURE and is normally set to a value of zero by the functioning of the phase shifter 24 in accordance with well-known locking oscillator technology. The time integral of the integrator 20 is set to be longer than the commutation cycle of the incoming signals.

The DC output voltage of the amplifier 22 drives the phase shifter to make the aforementioned voltage $V_1$ equal to zero whereby when that occurs, frequency $f_2 \pm \Delta f$ is equal to frequency $f_1$. The DC output voltage of the amplifier 22 is added to the phase shifter 24 by mechanical means i.e., rotary phase shifter, well-known to those skilled in the art. The output at terminal 30 at $f_2 \pm \Delta f = f_1$ comprises the desired standard frequency, fs and is coupled to a clock or is shifted to another stable frequency.

The underlying concept of the above described system is based upon the fact that the need for accurate frequency arises principally in communication and navigational situations in which two or more units remote from each other must either maintain synchronization or must observe frequency allocation. That is, some type of link or links exist wherein antennas are employed for transmission or reception. Isolated feeler units such as one computer ordinarily have only very nominal requirements for frequency accuracy.

Under the above circumstances, those situations requiring precise frequency will have an antenna available. In this case, standard frequency information from several transmission sources is received by antenna 10. Thus complete reliance is not necessarily placed on a standard oscillator since VLF transmissions are source of standard frequency and since they fall within a frequency band well removed from those frequencies commonly used for communications.

The advantage of using standard frequency signals is that the local oscillator 26 is not expected to provide the inherent stability. Indeed it need only be sufficiently stable to allow signal acquisition, i.e., be within the acquiring bandwidth and allow reasonable signal integration. Nominal integration time might be in the order of 1-minute using a tracking bandwidth of 0.01 Hz.

For a 10-kHZ VLF signal such as used in the Omega system, the above implies that the oscillator need only be calibratable to a few parts in $10^6$ over about one minute while an accuracy potentially as low as 1% is needed to acquire the signal within a 100-Hz front end bandwidth. It can be appreciated that these requirements are extremely nominal.

Once the VLF signal is acquired the frequency stability will be determined by the VLF propagational variation and Doppler. For the applications envisioned, Doppler effects will not be significant as, if they were, frequency shifts and the received and transmitted signals as derived from precision standards would also be important. VLF diurnal phase variations, however, are ordinarily less than one part in $10^8$ and there is no long term off-set since the VLF transmissions are controlled to standard time.

A possible disadvantage in the above is that the frequency package must receive VLF signals for the using system to function. This disadvantage, however, is far less serious than it might at first appear. VLF signals have been recognized for their reliability for over half a century. Signal transmission, particularly for Omega navigational signals, is highly reliable, and further, the signals are redundant. The only real probability, although very small, is that the VLF signals could not be received because of extraordinarily high local noise conditions in which case the using system might fail. The small probability, however, in comparison with the probability that a precision oscillator in the field will have drifted beyond specification emphasizes the importance of the concept disclosed herein.

It is apparent that it is important to use maximum signal redundancy with minimum complexity. The concept technique disclosed herein utilizes the reception of VLF signals without attention to source, that is, without commutating. Accordingly, the integrator 20 in the phase tracking circuit receives a signal made up of eight components, each given by $A_i \sin(\omega\tau + \phi_i)$.

Although the signals are not simultaneous, the integration voltage will be equivalent to that obtained from a signal given by the following equation:

$$S = \sum_{i=1}^{8} A_i \sin(\omega\tau + \phi_i)$$

By the distribution of, for example, Omega stations over the earth, several of the $A_i$ will be generously large for phase tracking at any location. The only difficulty is that the signals might be, in effect, equal and out of phase, in which case no tracking would occur. This, however, appears quite unlikely. Consider two signals of amplitude A, phases $\phi_1$ and $\phi_2$, whereby:

$$S = A \sin(\omega\tau + \phi_1) + A \sin(\omega\tau + \phi_2)$$
$$= A(\cos\phi_1 + \cos\phi_2)\sin\omega\tau + A(\sin\phi_1 + \sin\phi_2)\cos\omega\tau$$

so that S is a carrier frequency signal of amplitude equal to the following:

$$A = \sqrt{(\cos\phi_1 + \cos\phi_2)^2 + (\sin\phi_1 + \sin\phi_2)^2}$$

Since $\phi_2$ is nominally independent of $\phi_1$, the expected signal can be obtained by integration through phase differences between 0 and $2\pi$ to yield $A\sqrt{2}$. Thus, although perfect cancellation is possible, it should be ordinarily expected to obtain an effective increase in amplitude. It can be appreciated that the effective signal to be considered derives more in the nature of a random walk of initial signals in which case the probability of no result of signals vanishes.

It can be appreciated that a standard frequency package for general use has been disclosed. The concept embodied in the invention resides in the use of multiplexing a receiving antenna, phase tracking VLF signals without decommutation, and the use of relatively poor oscillator.

The resultant package can be cost competitive with a good oscillator. As shown the standard frequency would be RF. In practice the output would be same standard frequency by well-known translation techniques. Viewed as an oscillator it will require minimum time for warm-up or signal acquisition, no temperature coefficient, no long-term frequency drift, no need for recalibration or adjustment, and have a nominal accuracy of $10^8$ for time intervals in the order of hours. These characteristics obviously exceed present frequency requirements for new field communication equipment.

Obviously many modifications and variations of the present invention are possible in the light of the above teachings. It is therefore to be understood that within the scope of the appended claims the invention may be practiced otherwise than as specifically described.

What is claimed is:

1. Standard frequency apparatus comprising:

antenna means for receiving VLF signals transmitted from a number of remote sources;

clipper means connected to the output of said antenna means, filter means connected to the output of said clipper means and amplifier means connected to the output of said filter means, said serially connected clipper, filter and amplifier means being responsive to said VLF signals to produce a first signal at a frequency $f_1$;

oscillator means for producing a second signal at a frequency $f_2$;

phase detector means having a first input connected to the output of said amplifier means, a second input and an output;

phase shifter means having a first input connected to the output of said oscillator means, a second input and an output, integrator and amplifier means connecting the output of said phase detector means to the second input of said phase shifter means, said phase shifter output ($f_2 \pm \Delta f$) being connected to the second input of said phase detector means whereby when $f_1 = f_2 \pm \Delta f$, the output of said phase detector is equal to zero; and, output terminal means connected to the output of said phase shifter means to produce said standard frequency when $f_2 \pm \Delta f = f_1$.

* * * * *